United States Patent
Herbelleau

(10) Patent No.: US 6,460,587 B1
(45) Date of Patent: Oct. 8, 2002

(54) CROWN REINFORCEMENT FOR RADIAL TIRE

(75) Inventor: Yves Herbelleau, Riom (FR)

(73) Assignee: Compagnie Générale des Etablissements Michelin-Michelin & Cie, Clermont-Ferrand Cedex (FR)

( * ) Notice: Subject to any disclaimer, the term of this patent is extended or adjusted under 35 U.S.C. 154(b) by 0 days.

(21) Appl. No.: 09/470,463

(22) Filed: Dec. 22, 1999

Related U.S. Application Data

(63) Continuation of application No. PCT/EP98/03860, filed on Jun. 24, 1998.

(30) Foreign Application Priority Data

Jun. 26, 1997 (FR) .............................. 97 08321

(51) Int. Cl.$^7$ .................................................. B60C 9/18
(52) U.S. Cl. ........................ 152/526; 152/531; 152/535; 152/538
(58) Field of Search ................. 152/535, 536, 152/538, 526, 527, 531

(56) References Cited

U.S. PATENT DOCUMENTS

| | | | |
|---|---|---|---|
| 2,939,502 A | 6/1960 | Hindin et al. ............... | 152/352 |
| 3,789,898 A | * 2/1974 | Montagne ............... | 152/209.18 |
| 4,293,019 A | * 10/1981 | Maiocchi ..................... | 152/527 |
| 4,934,428 A | 6/1990 | Aoki et al. .................. | 152/532 |
| 5,117,887 A | 6/1992 | Lukosch et al. ............. | 152/538 |
| 5,213,642 A | * 5/1993 | Sponagel ..................... | 152/455 |
| 5,441,093 A | * 8/1995 | Shirasyougi ................. | 152/454 |

FOREIGN PATENT DOCUMENTS

| | | | |
|---|---|---|---|
| GB | 2042429 | | 9/1980 |
| GB | 20424429 A | * | 9/1980 |
| GB | 2201925 | | 9/1988 |
| JP | 08085307 | * | 4/1996 |

* cited by examiner

Primary Examiner—Michael W. Ball
Assistant Examiner—Justin Fischer
(74) Attorney, Agent, or Firm—Baker Botts L.L.P.

(57) ABSTRACT

A tire having a crown, two sidewalls and two beads, a carcass reinforcement anchored in the two beads and a crown reinforcement, the crown reinforcement including radially, from inside outward, a working block with at least one ply of parallel cords of circular orientation and a protective block with at least one ply of parallel cords of elongation at rupture greater than that of the cords of the ply of circumferential orientation of the working block, characterized in that said ply of parallel cords of circumferential orientation is the radially outermost ply of said working block and in that the parallel cords of said ply of said protective block have a circumferential orientation.

7 Claims, 1 Drawing Sheet

CROWN REINFORCEMENT FOR RADIAL TIRE

This is a continuation of PCT/EP98/03860, filed Jun. 24, 1998.

BACKGROUND OF INVENTION

The present invention concerns tires with radial carcass reinforcement and, in particular, the protection of their crown reinforcement.

Tires intended to roll under difficult conditions, for example, on road surfaces containing stones or sharp objects, usually present a crown reinforcement comprising a working block and, radially outward, a protective block. The working block is intended to absorb the stresses due to inflation and rolling of the tire and comprises at least two superposed plies of cords parallel in each ply and crossed from one ply to the next by forming angles ($\alpha$, $\beta$) with the circumferential direction ranging between 10° and 45°.

The protective block is intended to protect the plies of the working block from damages due to shocks and perforations sustained in use and comprises at least one ply of parallel wires. Said cords often have an elongation at rupture exceeding that of the working plies they protect.

In order to improve the endurance of the crown reinforcement of such a tire, application WO 96/20095 discloses a tire comprising a crown, two sidewalls and two beads, a carcass reinforcement anchored in the two beads and a crown reinforcement, said crown reinforcement including radially, from inside outward, a working block with at least one ply of parallel cords of circumferential orientation and one protective block with at least one ply of parallel cords of elongation at rupture greater than that of the cords of the ply of circumferential orientation of the working block, in which said working block comprises radially, from inside outward, a triangulation ply of wires oriented at least 60°, two working plies formed by inextensible wires oriented at angles ranging between 10 and 45° and said ply of parallel cords of circumferential orientation of the working block placed between the two working plies, and in which the cords of the ply of the protective block have an orientation similar to that of the cords of the adjacent working ply of the working block.

SUMMARY OF THE INVENTION

The object of the invention is another tire architecture also making it possible to improve substantially the endurance of the crown reinforcement and, notably, its resistance to shocks, perforations and oxidation due to rolling over road surfaces containing sharp stones.

The following meanings apply:

"cord"—monofilaments as well as multifilaments, or assemblages like cables, yarns or even any type of equivalent assemblage, whatever the material and treatment of said cords, like surface treatment or coating or precoating, for example, in order to promote adhesion on the rubber;

"inextensible wire"—a cord having a relative elongation less than 0.2% measured under 10% of its breaking load;

"elastic wire"—a cord having a relative elongation greater than 0.5% measured at 10% of its breaking load;

"a circumferentially oriented cord"—a cord oriented roughly parallel to the circumferential direction of the tire, that is, forming an angle with that direction in the +2.5 to −2.5° range and around 0°;

"a radially oriented cord"—a cord contained roughly in the same axial plane or in a plane forming with an axial plane an angle less than or equal to 10°.

The tire, according to the invention, comprises a crown, two sidewalls and two beads, a carcass reinforcement anchored in the two beads and a crown reinforcement. The crown reinforcement comprises radially, from inside outward, a working block and a protective block. The working block has at least two superposed working plies formed by cords parallel in each ply and crossed from one ply to the next by forming angles ($\alpha$, $\beta$) with the circumferential direction ranging between 10° and 45° and one ply of parallel cords of circumferential orientation. The protective block has at least one ply of parallel cords of elongation at rupture greater than that of the cords of the ply of circumferential orientation of the working block. Said tire is characterized in that the ply of parallel cords of circumferential orientation is the radially outermost ply of the working block, in that the parallel cords of the ply of the protective block have a circumferential orientation and in that the ply of parallel cords of circumferential orientation of the working block has an axial width less than the axial width of the narrowest of the working plies, as well as than the axial width of the ply of cords of circumferential orientation of the protective block.

The circumferential orientation of the protective ply and of the adjacent ply of the working block, as well as the fact that the ply of the crown reinforcement whose axial width is narrowest is the ply of cords of circumferential orientation of the working block, make it possible to improve remarkably the resistance to shocks, perforations and oxidation resulting therefrom of the crown reinforcement of the tire according to the invention.

Preferably, the ratio of elongation at rupture between the cords of the ply of parallel cords of circumferential orientation of the protective block and the cords of the ply of parallel cords of circumferential orientation of the working block is greater than 1.5. This makes it possible for the cords of the protective ply not to be under stress on normal rolling and thus to be fully effective in resisting any penetration.

The axial width of the ply of cords of circumferential orientation of the protective block ranges advantageously between the axial width of the narrowest working ply and the axial width of the widest working ply.

The circumferentially oriented ply of the working block can be formed by elastic cords, presenting a curve of tensile stress as a function of relative elongation having low gradients for slight elongations and a roughly constant and steep gradient for greater elongations. Said ply can also be formed by cords circumferentially oriented and cut so as to form sections of length much less than the circumference of the ply. But, in order to obtain an excellent absorption of circumferential stresses, that ply can consist of inextensible wires.

The ply of the protective block can be formed by elastic wires or textile yarns such as aramids.

The two plies of parallel cords of circumferential orientation can also be formed in textile yarns, notably, aramids.

The characteristics and advantages of the invention will be best understood by means of the description which follows and refers to the drawing, nonlimitatively illustrating working examples.

DESCRIPTION OF THE PREFERRED EMBODIMENTS

Figure 1:
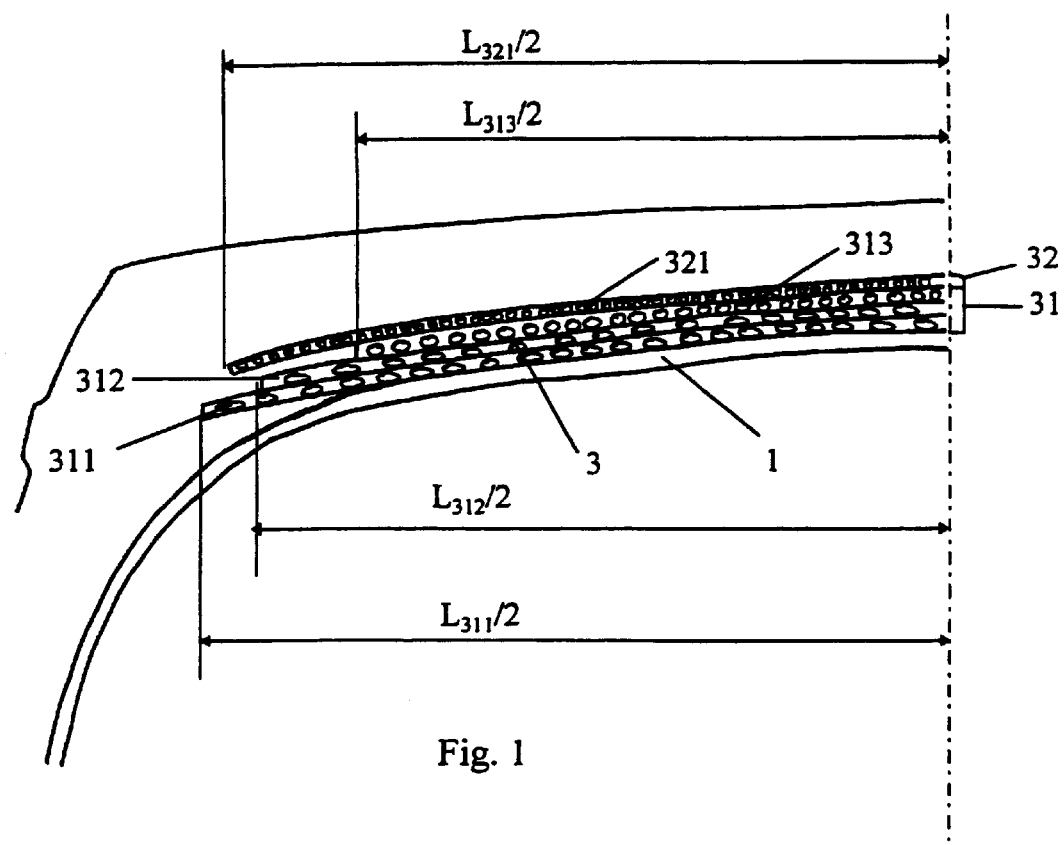
FIG. 1 schematically represents, seen in axial section, a crown reinforcement according to the invention.

The tire P comprises a radial carcass reinforcement 1 anchored in each bead and formed by aramid yarns. Said carcass reinforcement 1 is wound with a crown reinforcement 3, consisting of a working block 31 and a protective block 32 arranged radially outward from the working block.

The working block is radially formed from inside outward:

- by a first working ply 311 made up of inextensible wires oriented relative to the circumferential direction by an angle $\alpha$, equal in this case to 22°;
- then by a second working ply 312 made up of wires identical to those of the first working ply and forming with the circumferential direction an angle $\beta$, opposite angle $\alpha$ and, in the case shown, equal to said angle $\alpha$ of 22° (but which can be different from said angle $\alpha$); and
- by a third working ply 313 formed by inextensible wires circumferentially oriented.

The protective block 32 is formed by a ply of elastic wires circumferentially oriented.

The axial width of the third working ply $L_{313}$ is less than the axial widths of the first two working plies $L_{311}$ and $L_{312}$. On the other hand, the axial width of the ply of the protective block $L_{321}$ ranges between the axial widths of the first two working plies $L_{311}$ and $L_{312}$.

The tire according to the invention is now comparable to a standard tire having a crown reinforcement with a working block consisting of a triangulation ply and two crossed working plies and a protective block formed by a ply of elastic wires oriented in the direction of the adjacent working ply.

The rolling of these two types of tires over a track strewn with coarse stones with sharp cutting edges reveals, once the tire tested is moistened by passage in a salt water tank, the excellent performance of the tire according to the invention and represented in FIG. 1. On bursting of the control tire, a fine analysis of the two tires showed that the tire according to the invention had undergone two times fewer perforations of the tread up to the protective block than the control tire.

Consequently, contrary to what might be feared, placing the third working ply 313 formed by yarns of circumferential orientation directly under the protective ply 321 did not entail for this third ply a marked susceptibility to damage linked to perforations and to cuts. Rather, the result of these tests shows that the crown reinforcement of the tire according to the invention is very notably more resistant than that of the standard tires.

Figure 2:
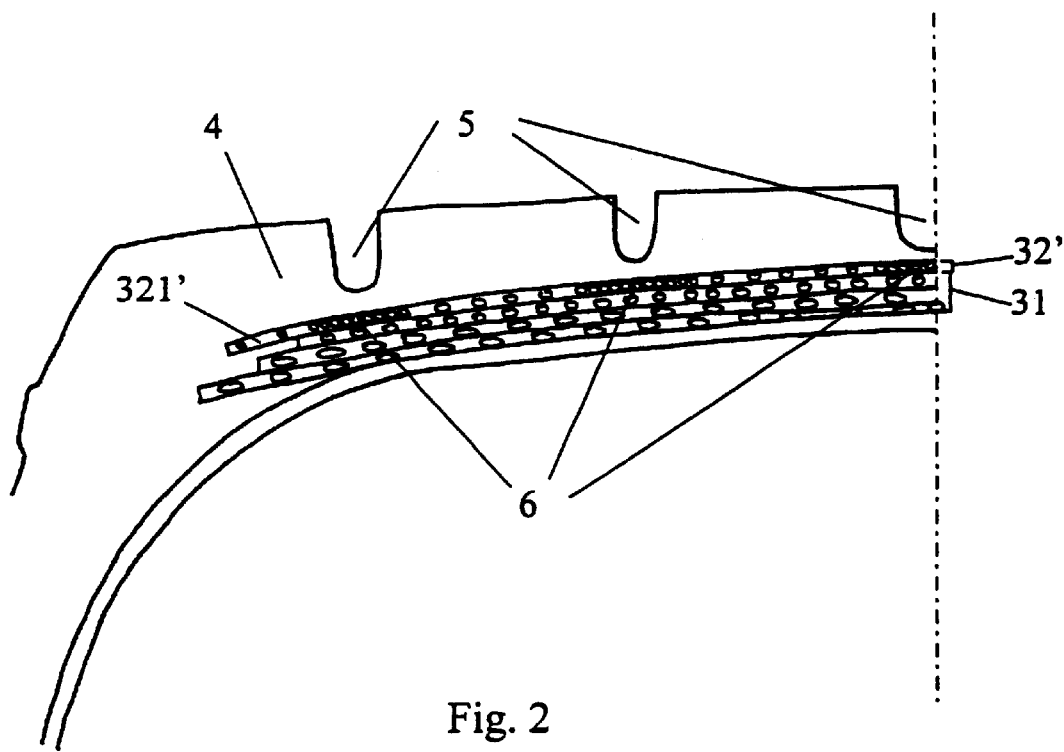
FIG. 2 represents a working variant of a crown reinforcement according to the invention.

FIG. 2 shows in axial section a variant embodiment of the tire according to the invention. Three circumferential grooves 5 are shown in the tread 4. These grooves can usually be zigzag. In this variant, the pitch, that is, the space between the cords, of the ply 321' of the protective block 32' is much smaller in the zones 6 under the grooves than in the rest of the ply. Consequently, the protection afforded by said ply 321' is reinforced in the zones 6 under the grooves 5, where the risks of perforation of the tread are greatest.

This makes it possible to adapt the protection to the needs without increasing the quantity of metal in the crown reinforcement and, therefore, the weight of the tire.

Manufacture of the tire according to the invention can advantageously be carried out on a rigid core setting the shape of its inner cavity. All the constituents of the tire are applied on that core in the order required by the final architecture, being arranged directly in their final place, without undergoing shaping at any time during manufacture. The tire can then be molded and vulcanized, as described in U.S. Pat. No. 4,895,692.

The two plies 313 and 321 can be applied by winding of a single cord with a constant or variable pitch. The absence of shaping has the advantage of making it possible to use inextensible wires as component of the working ply 313 of circumferential orientation.

I claim:

1. A tire comprising a crown, two sidewalls and two beads, a carcass reinforcement anchored in the two beads and a crown reinforcement, said crown reinforcement comprising radially, from inside outward, a working block and a protective block, said working block having at least two superposed working plies formed by cords parallel in each ply and crossed from one ply to the next by forming angles ($\alpha$, $\beta$) with the circumferential direction ranging between 10° and 45° and one ply of parallel cords of circumferential orientation being the radially outermost ply of said working block, said protective block having at least one ply of parallel cords of circumferential orientation and of elongation at rupture greater than that of the cords of the ply of circumferential orientation of the working block, wherein said ply of parallel cords of circumferential orientation of said working block has an axial width less than the axial width of the narrowest of said working plies, and less than the axial width of said ply of cords of circumferential orientation of said protective block, and wherein the ratio of elongation at rupture between the cords of the ply of parallel cords of circumferential orientation of the protective block and the cords of the ply of parallel cords of circumferential orientation of the working block is greater than 1.5.

2. A tire according to claim 1, in which said ply of cords of circumferential orientation of said protective block has an axial width ranging between the axial width of the narrowest working ply and the axial width of the widest working ply.

3. A tire according to claim 1, the radially outer surface of the crown of which presents a sculpture comprising ribs separated by circumferential grooves, in which said ply of cords of circumferential orientation of the protective block presents an axial variation of pitch with a maximum density of cords arranged radially under said grooves.

4. A tire according to claim 1, in which the cords of the ply of parallel cords of circumferential orientation of said working block consist of inextensible wires.

5. A tire according to claim 1, in which the cords of the ply of parallel cords of circumferential orientation of said protective block consist of elastic wires.

6. A tire according to claim 1, in which the cords of the ply of parallel cords of circumferential orientation of said protective block consist of textile yarns.

7. A tire according to claim 1, in which the cords of said two plies of circumferential orientation consist of aramid.

* * * * *